United States Patent [19]

Shimizu

[11] Patent Number: 5,592,250
[45] Date of Patent: Jan. 7, 1997

[54] DRIVING MECHANISM FOR A PHOTOGRAHING OPTICAL SYSTEM

[75] Inventor: Hitoshi Shimizu, Tokyo, Japan

[73] Assignee: Asahi Kogaku Kogyo Kabushiki Kaisha, Tokyo, Japan

[21] Appl. No.: 491,764

[22] Filed: Jun. 19, 1995

[30] Foreign Application Priority Data

Jun. 21, 1994 [JP] Japan .................................. 6-160780

[51] Int. Cl.⁶ ................................................ G03B 1/18
[52] U.S. Cl. .......................... 396/79; 396/85; 396/133
[58] Field of Search ........................ 354/195.1, 195.12; 348/358; 359/676

[56] References Cited

U.S. PATENT DOCUMENTS

| | | | |
|---|---|---|---|
| 2,940,373 | 6/1960 | Berg et al. | 354/195.12 |
| 3,656,422 | 4/1972 | Hess et al. | 354/195.1 |
| 4,696,559 | 9/1987 | Kondo | 354/403 |
| 5,041,855 | 8/1991 | Takezawa et al. | 354/195.1 |
| 5,168,295 | 12/1992 | Yoshihara et al. | 354/173.1 |
| 5,365,301 | 11/1994 | Sugita et al. | 354/195.1 |

FOREIGN PATENT DOCUMENTS 3-208003  9/1991  Japan .
3-208033  9/1991  Japan .

*Primary Examiner*—Safet Metjahic
*Assistant Examiner*—Eddie C. Lee
*Attorney, Agent, or Firm*—Greenblum & Bernstein P.L.C.

[57] ABSTRACT

A photographing device includes a driving mechanism provided in a photographing optical system, a driving source located outside the photographing optical system, a rotational shaft located parallel with an optical axis of the photographing optical system, and in the photographing optical system, and connecting the driving source and the driving mechanism, an electro-magnetic clutch mechanism located around the optical axis of the photographing optical system, and arranged to connect/disconnect the driving mechanism and the driving source.

31 Claims, 10 Drawing Sheets

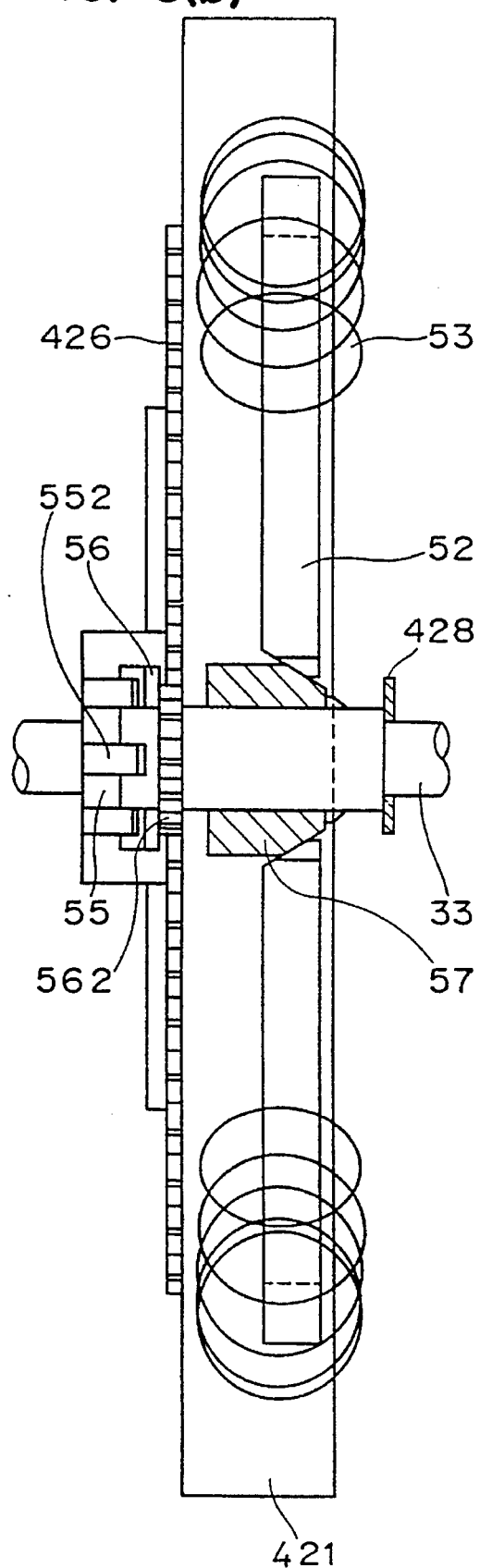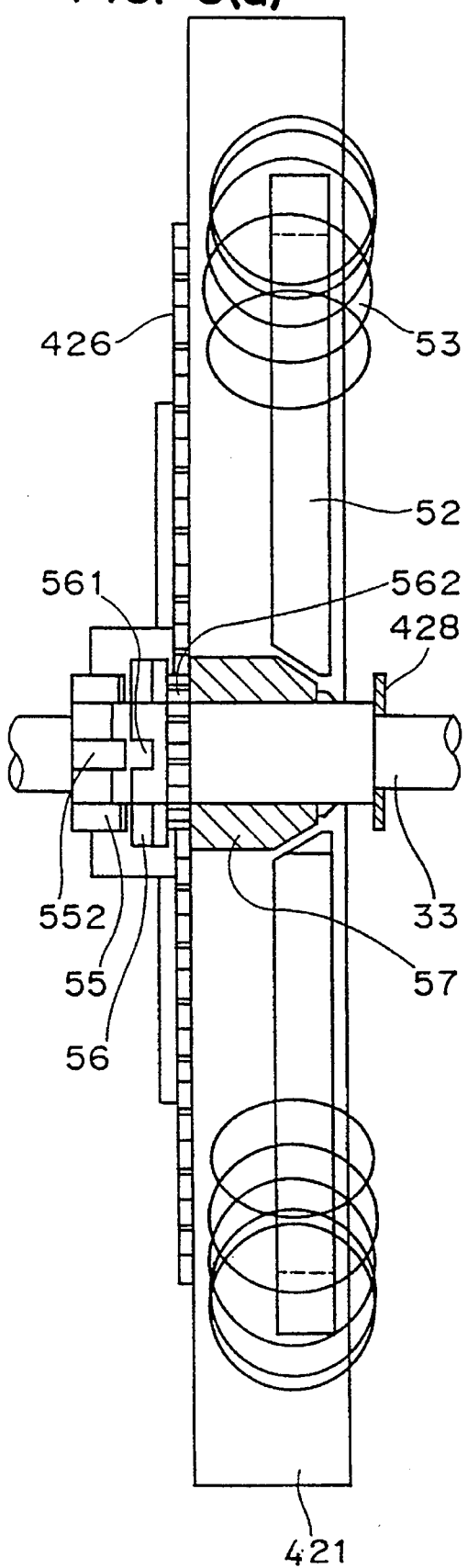

5,592,250

DRIVING MECHANISM FOR A PHOTOGRAHING OPTICAL SYSTEM

A BACKGROUND OF THE INVENTION

1. Field of the Invention

The present invention relates to a photographing device which has been used in a still camera, a video camera, a still video camera and so forth. The photographing device is employed in the above mentioned cameras to form optically an image of an object on a photosensitive element or an image pick-up device. In particular, the present invention relates to a photographing device in which a driving member is located outside a lens barrel and is arranged to drive a driven member in the lens barrel.

2. Description of Related Art

According to FIG. 10, in which a video camera is an example, a photographing device per se known, which is a zooming device having an automatic focusing function, is shown. A part of the prior-art photographing device is arranged in a lens barrel attached to the front side of the video camera. When a zooming switch 2, which is provided on a camera body 1, is manually operated, a driving motor 3 rotates forwardly or reversely, and a driving force generated by the motor 3 is transmitted to a cylindrical cam ring 5 through a gear train 4, so that the cam ring 5 consequently rotates around an optical axis of the lens barrel.

In the cylindrical cam ring 5, a frame 6 is fixedly located along the optical axis, and a pair of guide shafts 6a and 6b are arranged in the frame 6 in a manner that the shafts 6a and 6b are parallel with the frame 6. In the lens groups which constitute a photographing optical system, a front movable lens group 7 and a rear movable lens group 8 are arranged to be movable along the pair of guide shafts 6a and 6b. Specifically, a lens supporting frame 7A for the front movable lens group 7 and a lens supporting frame 8A of the rear movable lens group 8 are moveably engaged with the pair of the guide shafts 6a and 6b. Moreover, the front lens supporting frame 7A and the rear lens supporting frame 8A, respectively, have projections 7a and 8a projected in a radial direction of the cylindrical cam ring 5 so that these projections 7a and 8a engage with cam grooves 5a and 5b formed on the cylindrical cam ring 5.

When the cylindrical cam ring 5 is rotated by the motor 3, a zooming operation is performed by a movement of the lens supporting frame 7A (the front movable lens group 7) and the lens supporting frame 8A (the rear movable lens group 8) along with the cam grooves 5a and 5b and the pair of the guide shafts 6a and 6b. After a predetermined focal length is set, an automatic focusing is performed, so that an image of an object is formed on a CCD (charge coupled device) 9. In the camera body 1, a control circuit 10 is provided to control the motor 3.

In a photographing device of the type explained above, a zooming operation is performed by relative movement of the front and rear movable lens groups 7 and 8 with rotation of the cam ring 5. On the other hand, for performing focusing, a part of the lens group is required to be moved independently from the rest of the lens groups provided in the lens barrel. For the purpose of focusing, in the prior-art photographing device of FIG. 10, a fine adjustment of the front movable lens 7 is made by moving the front movable lens 7 forwardly or rearwardly with respect to the lens supporting frame 7A. An example of the fine adjustment of the front movable lens 7 for the purpose of focusing is shown in FIG. 11. An auxiliary motor 3A (an auxiliary driving source) exclusively used for focusing is provided on the lens supporting frame 7A, so that the lens supporting frame 7A can only be moved forwardly or rearwardly along the optical axis direction by the auxiliary motor 3A.

The arrangement of the auxiliary motor 3A as shown in FIG. 11 may cause adverse effects to the whole structure of the lens system, such as vibration of lenses, and blur of an image, because the auxiliary motor 3A inevitably generates vibration while the same is rotating, and the vibration is transmitted to the front movable lens group 7, the rear lens movable lens group 8, and other lens groups.

In addition to the above adverse effects, as the auxiliary motor 3A is provided at a circumferential portion of the lens supporting frame 7A, a weight-balance of the lens supporting frame 7A with respect to the optical axis is not in equilibrium, which generates a moment. Consequently, an uneven force is applied to the lens supporting frame 7A, so that smooth traveling of the lens supporting frame 7A is hampered. Due to a helicoid connection between the front movable lens 7 and the front lens supporting frame 7A, which is usually observed in this type of photographing device, if the uneven force is applied to the helicoid, repeated movement of the front movable lens 7 causes wear of the helicoid. These adverse effects may shorten the life expectancy and may degrade reliability of the photographing device.

The above explanations are based on a case in which at least one of the lens groups in the photographing optical system can be moved independently from other lens groups. The same type of problems mentioned above may possibly arise in a case where an aperture control mechanism and so forth, provided in a lens barrel, is operated independently, by an auxiliary motor provided in the lens barrel, from the lens groups of the photographing optical system.

SUMMARY OF THE INVENTION

A primary object of the present invention is to provide a photographing device in which vibration caused by the auxiliary motor exclusively used for moving a part of the photographing optical system (e.g., at least one of the lens groups) and an uneven weight balance of the photographing optical system are eliminated. Another object of the present invent ion is to provide a photographing device which has, by eliminating vibration and an uneven weight balance in the photographing optical system, improved image forming characteristics and performs smooth lens movement.

To achieve the objects mentioned above, according to the present invention, there is provided a photographing device including a driving mechanism provided in a photographing optical system, a driving source located outside the photographing optical system, a rotational shaft located parallel with an optical axis of the photographing optical system, the rotational shaft, located in the photographing optical system, and connecting the driving source and the driving mechanism, an electro-magnetic clutch mechanism located around the optical axis of the photographing optical system, the electro-magnetic clutch mechanism arranged to connect/disconnect the driving mechanism and the driving source.

According to another aspect of the present invention, there is provided a photographing device including a photographing optical system containing a plurality of lens groups, a first means for moving the lens groups for a first operation of the photographing optical system, and being driven by a first driving source located outside the photographing optical system, a second means for moving the lens groups for a second operation of the photographing optical system, and being driven by a second driving source located outside the photographing optical system, and means for coordinating the first and the second moving means so that while one of the first and second operations is performed, one of the second and first operations is suspended.

The present disclosure relates to the subject matter contained in the Japanese patent application No. 6-160780, filed on Jun. 21, 1994, which is expressly incorporated herein by reference in its entirety.

BRIEF DESCRIPTION OF THE DRAWINGS

The invention will be described below with reference to the accompanying drawings, in which;

FIG. 6(a) is a view indicating an operation of the clutch mechanism;

FIG. 6(b) is a view indicating an operation of the clutch mechanism;

DESCRIPTION OF THE PREFERRED EMBODIMENTS

Figure 1:
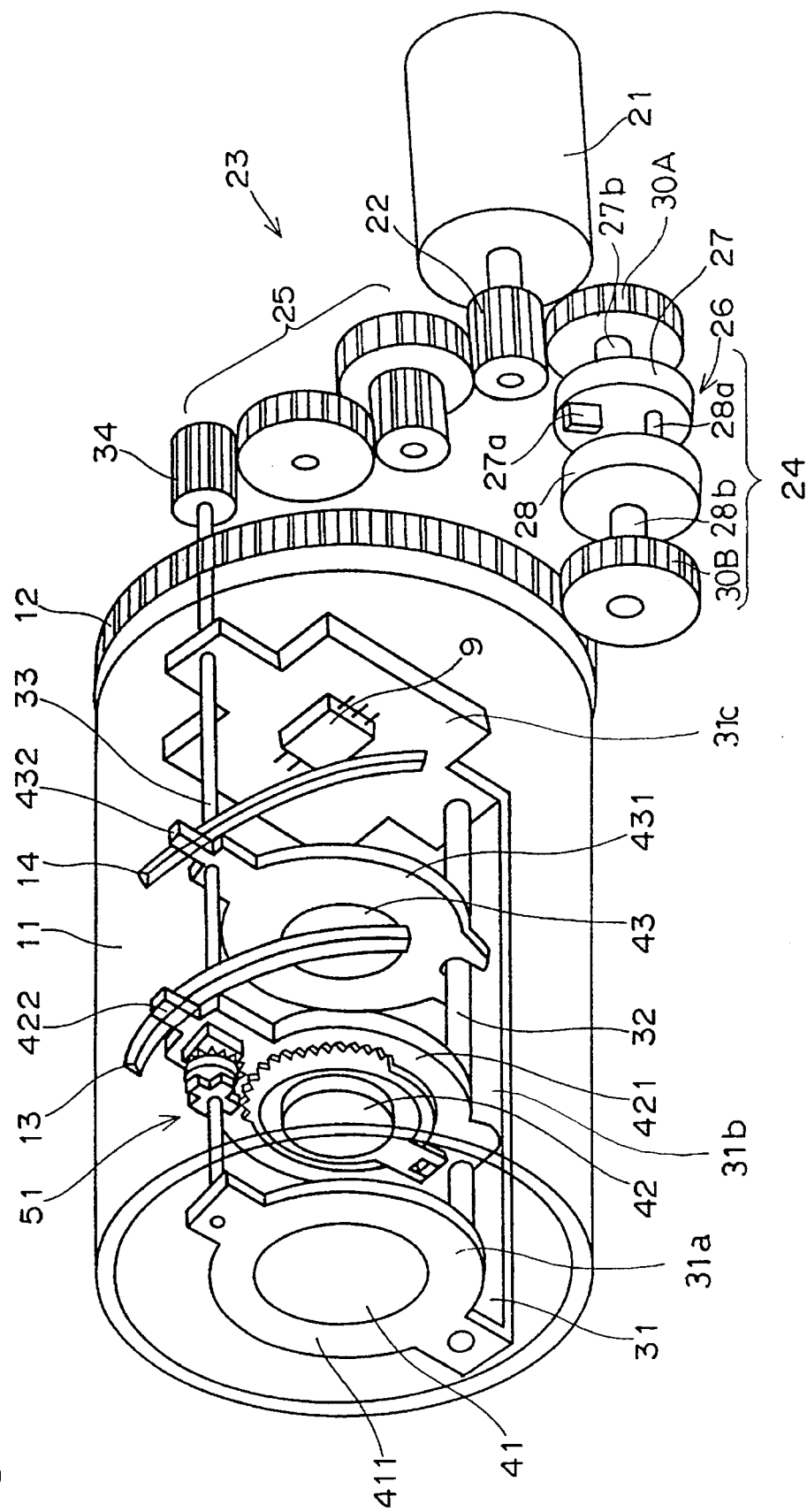
FIG. 1 is a perspective view of the photographing device in which the first embodiment of the present invention is shown.
Figure 2:
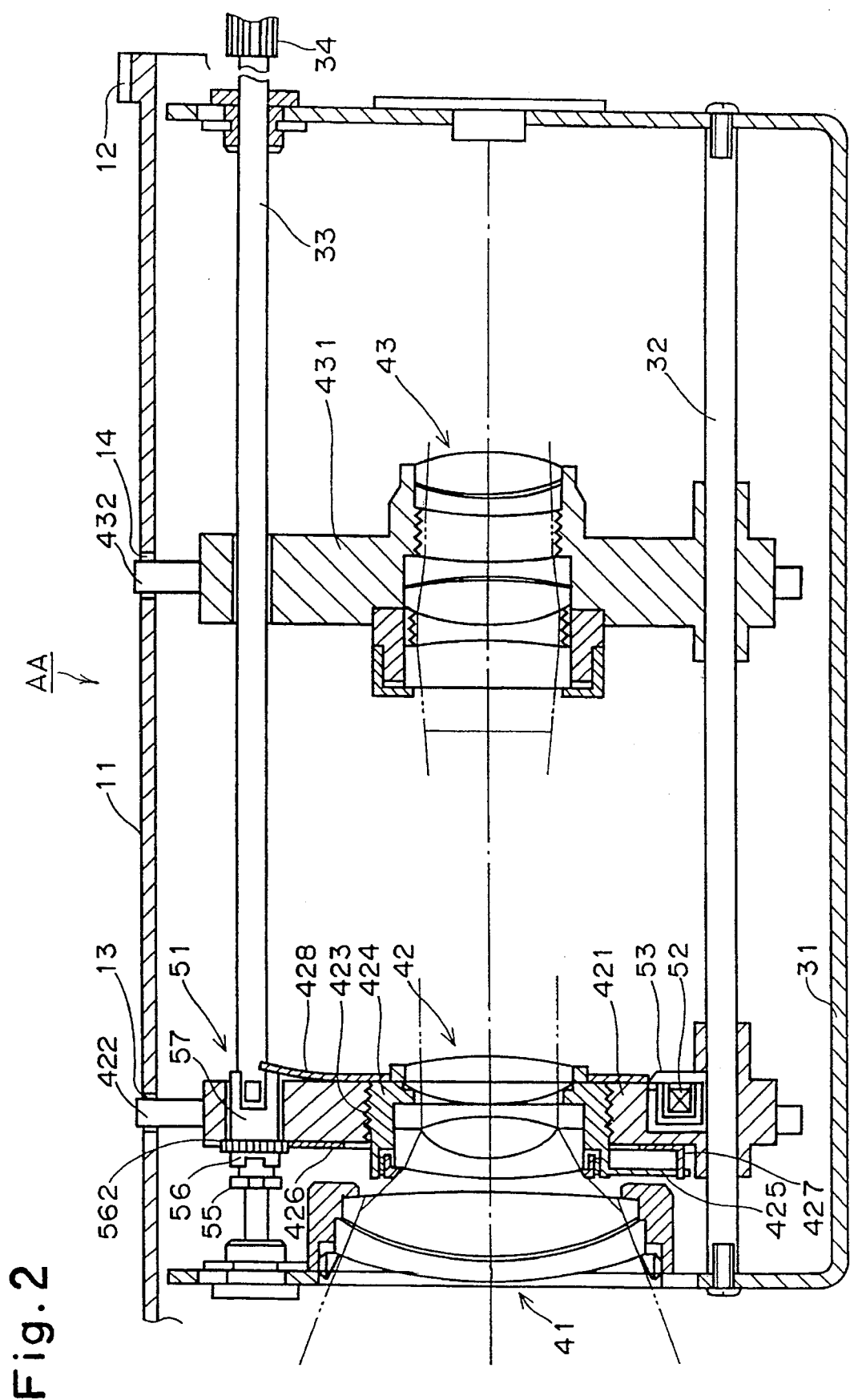
FIG. 2 is an enlarged cross sectional side view of FIG. 1.
Figure 10:
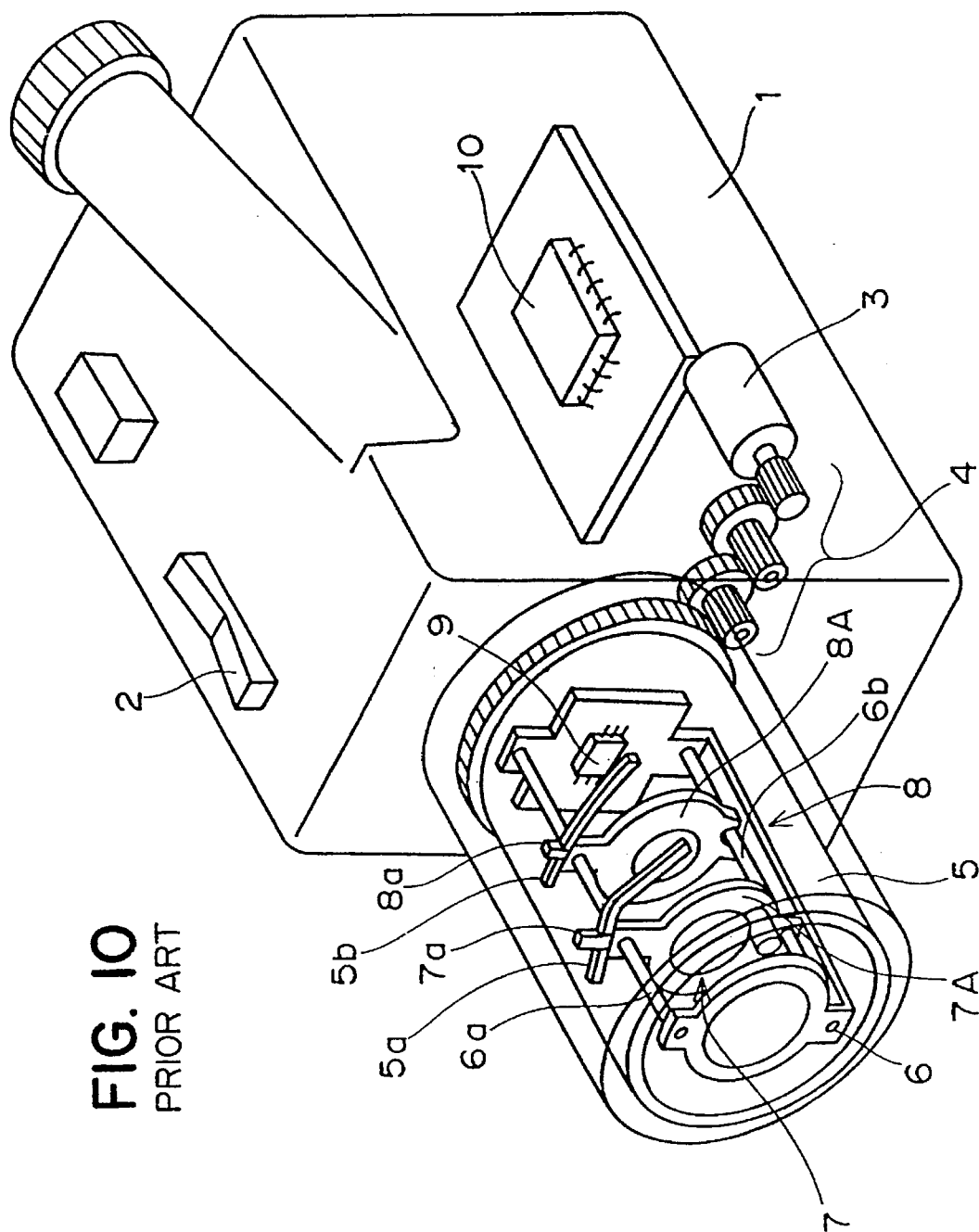
FIG. 10 is a perspective view of the photographing device of the prior art.
Figure 11:
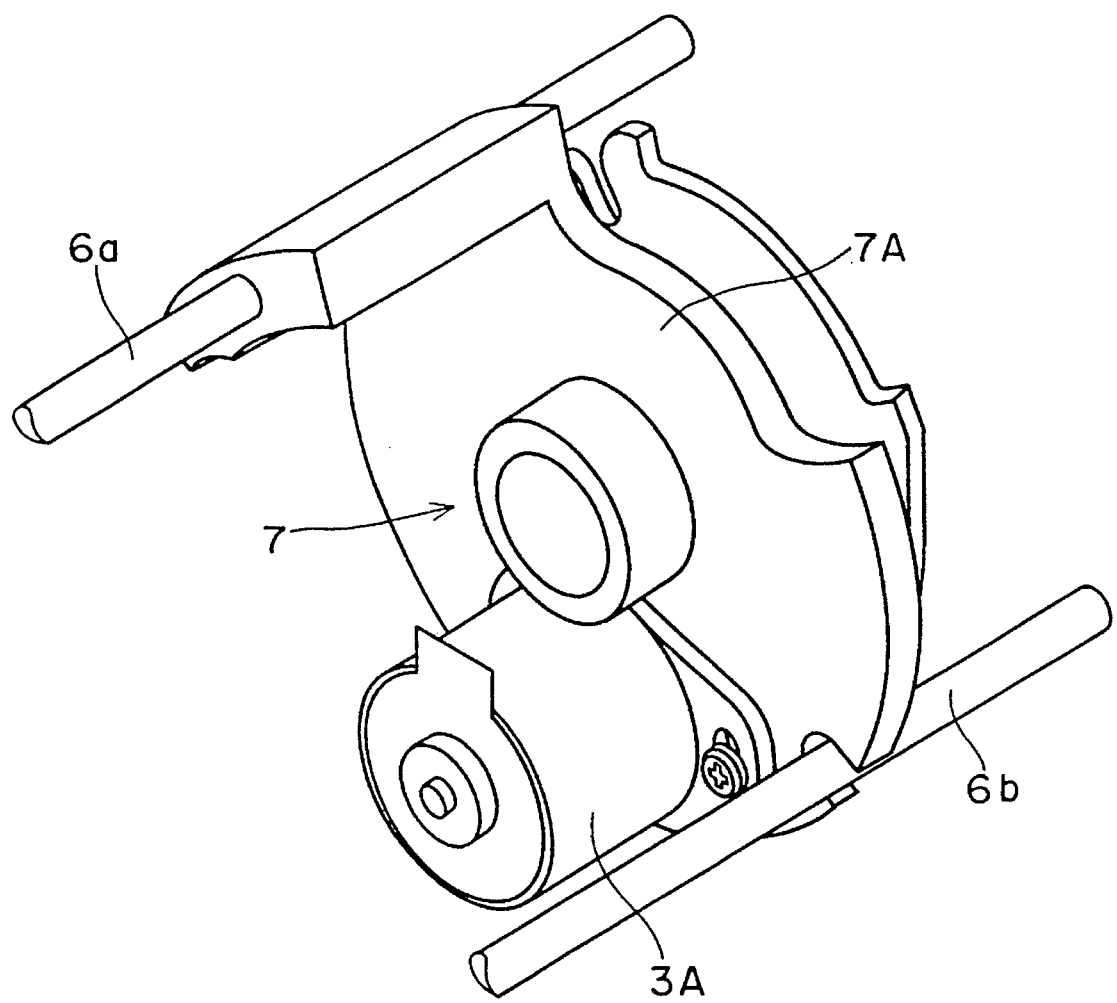
FIG. 11 is an enlarged perspective view of the prior art.

FIG. 1 through FIG. 7 show the first embodiment of the present invention. FIG. 1 is a perspective view of a photographing device AA, constituted by a zooming device of automatic focusing type as shown in FIG. 10, to which the present invention is applied. The photographing device AA contains a plurality of lens groups 41, 42 and 43 constituting a photographing optical system. As FIG. 1 also shows, a CCD (charge coupled device) 9 is provided behind the photographing optical system along an optical axis direction so that an image of an object is formed on the CCD 9 and video signals according to the formed image are generated. FIG. 2 is an enlarged cross sectional side view of the device of FIG. 1. As these figures show, the photographing device AA includes a cylindrical cam ring 11 that is rotatable around an optical axis of the lens groups 41, 42 and 43 by a driving motor 21 constituted by a stepping motor as a driving source. The cylindrical cam ring 11 and the lens groups 41, 42 and 43 are contained in a lens barrel (not shown) coaxially surrounding the cylindrical cam ring 11.

Providing the lens barrel is a normal provision for a still camera, a video camera, a still video camera and so forth, to which the present invention is directed. The zooming switch 2 provided on the camera body 1, as already shown in FIG. 10, actuates the driving motor 21 to cause a relative movement of the lens groups toward a telephoto end or a wide angle end, and the control circuit 10 is designed to control the rotation of the driving motor 21. In this embodiment, however, the details on the operation of the zooming switch 2 and the control circuit 10 are not explained.

On the cylindrical cam ring 11, a gear 12 is integrally formed around an outer circumference of the cylindrical cam ring 11 at the end of the camera body side. Similar to the driving motor 3 of FIG. 10, the driving motor 21 is located in the camera body that is not shown in FIG. 1 and FIG. 2. The driving motor 21 has a driving gear 22 coaxially provided at the end of a driving shaft of the motor 21. The driving gear 22 and the gear 12 formed on the cylindrical cam ring 11 are connected through a gear train 25 so that a driving torque generated by the driving motor 21 is reduced and transmitted to the gear 12 to rotate the cylindrical cam ring 11. Also on the cylindrical cam ring 11, two cam grooves 13 and 14 with which lens supporting frames 421 and 431 (further described below) engage are formed. On the lens supporting frame 421 (the CCD 9 side), a shutter block (not shown) is provided so that the shutter block is movable together with the lens supporting frame 421 in the optical axis direction. By an open/close-control of shutter blades contained in the shutter block, an aperture control and an exposure time control with respect to the CCD 9 are performed.

Figure 5:
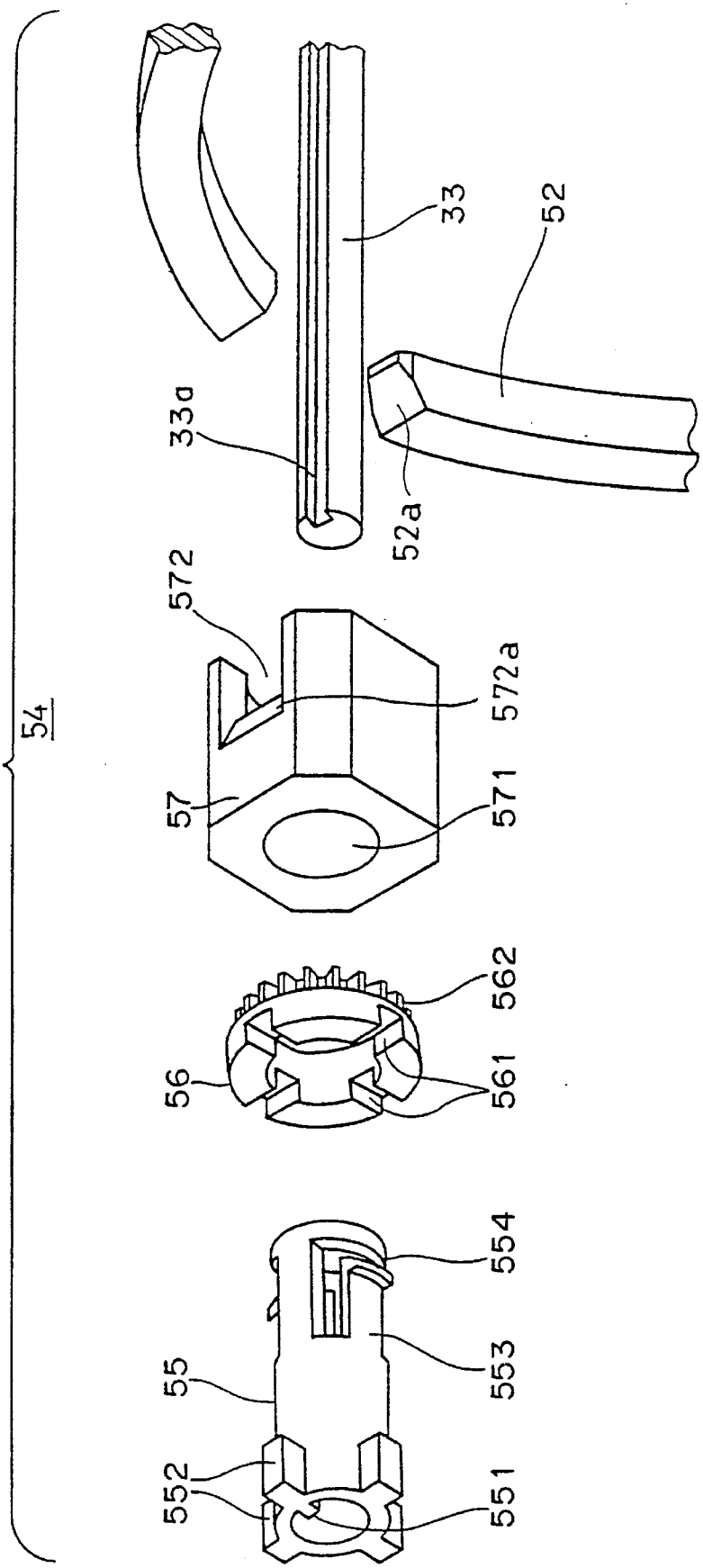
FIG. 5 is a partial perspective view of the clutch mechanism.

On the other hand, inside the cylindrical cam ring 11, a fixed frame 31 is located. The fixed frame 31 comprises a front supporting member 411, a connecting member 31b and a rear supporting member 31c. The connecting member 31b is located along an axis of the cylindrical cam ring 11 or the optical axis of the lens groups. At an object side of the connecting member 31b, the front supporting member 411 is integrally formed. At the camera body side of the connecting member 31b, the rear supporting member 31c is integrally formed. Between the front supporting member 411 and the rear supporting member 31c, a guide shaft 32 and a rotational guide shaft 33 are supported in a manner that the guide shaft 32 and the rotational guide shaft 33 and the connecting member 31b are parallel with the axis of the cylindrical cam ring 11 or the optical axis of the lens groups. The guide shaft 32 and the rotational guide shaft are formed to have a circular cross section with a predetermined diameter. The guide shaft 32 is fixedly, without rotation, supported in the fixed frame 31 and the rotational guide shaft 33 is supported in the fixed frame 31 in a manner that a rotation of the shaft 33 in either direction is allowed. As shown in FIG. 5, a part of the circumference of the rotational guide shaft 33, a key groove 33a is formed along the longitudinal direction so that a tube 55 of a clutch mechanism (further described below) is fixedly engaged with the rotational guide shaft 33 with the help of the key groove 33a. At the camera body end of the rotational guide shaft 33, a gear 34 is integrally formed so that the driving torque generated by the driving motor 21 is transmitted to the gear 34, through the gear train 25, to rotate the rotational guide shaft 33.

Figure 3A:
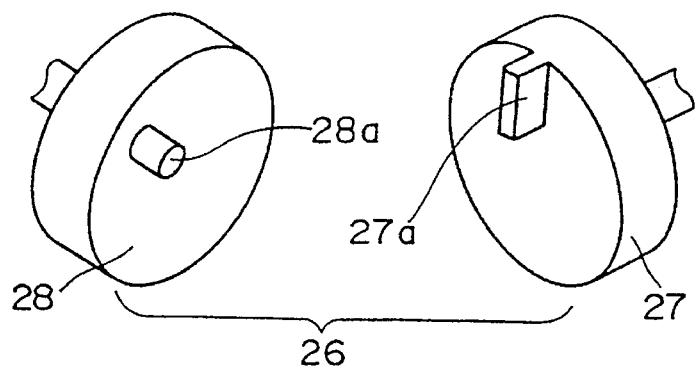
FIG. 3(a) is a view showing the operation of the idling mechanism.

In addition to the gear train 25 for transmitting the driving torque to the rotational guide shaft 33, as shown in FIG. 1, the other gear train 24, comprising a plurality of gears, for transmitting the driving torque from the driving motor 21 to the gear 12 formed around the cylindrical cam ring 11. The gear train 25 is constituted by a plurality of spur gears. On the other hand, the gear train 24 comprises a first gear 30A engaging with the gear 22 of the driving motor 21 and the second gear 30B engaging with the gear 12 formed around the cylindrical cam ring 11. And between the first and second gears 30A and 30B, an idling mechanism 26 is provided. As shown in FIG. 3(a), the idling mechanism 26 comprises a driving wheel 27 aligned with the first gear 30A through a rod 27b and a driven wheel 28 coaxially aligned with the second gear 30B through a rod 28b. Facing sides of the driving wheel 27 and the driven wheel 28 are spaced apart a predetermined distance along a torque transmission path from the driving motor 21 to the gear 12 formed around the cylindrical cam ring 11. A tab 27a is provided on the facing side of the driving wheel 27, and a pin 28a is provided on the facing side of the driven wheel 28.

Figure 3B:
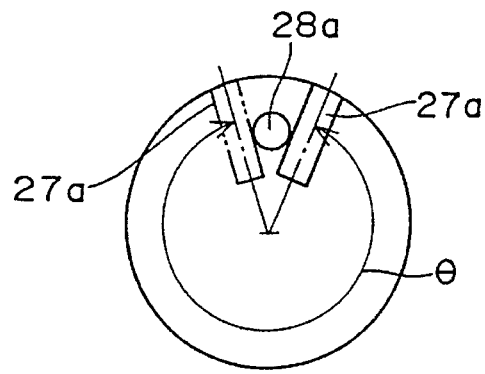
FIG. 3(b) is a view showing the operation of the idling mechanism.

According to the structure of the idling mechanism 26, when the driving wheel 27 rotates, the tab 27a comes into contact with and presses one or the other side of the pin 28a in the circumference direction, so that the driving torque is transmitted to the driven wheel 28. The state of the contact of the tab 27a and the pin 28a is shown FIG. 3(b). For example, the tab 27a depicted in the solid line is actually coming into contact with the pin 28a to transmit the driving torque. In this case, the rotation is counterclockwise. When the rotation is changed to clockwise, an idling period, which transmits no driving torque to the driven wheel 28, is observed during which the tab 27a (solid line) detaches from one side of the pin 28a and again comes into contact with the other side of the pin 28a. In other words, as shown in FIG. 3(b), the idling period corresponds to an angle Θ, which is equivalent to 360° minus the angle formed by the tab 27a (solid line) and the pin 28a, and the tab 27a (dotted line) and the pin 28a.

As explained later, the reduction ratio of the gear trains 24 and 25 are determined so that a rotation equivalent to the angle Θ of the idling mechanism 26 moves a front movable lens group 42 (further described below) from an advanced position where the front movable lens group 42 is most distant with respect to the lens supporting frame 421 to a retracted position where the front movable lens group 42 is closest to the lens supporting frame 421. A distance between the advanced and retracted positions is defined as a moving range of the front movable lens group 42, corresponding to the angle Θ, at the time of focusing operation.

FIG. 2 shows the details of the photographing optical system. In the cylindrical cam ring 11, a fixed lens group 41 is supported in the front supporting member 411, a front movable lens group 42 is supported in the lens supporting frame 421, and a rear movable lens group 43 is supported in the lens supporting frame 431. The guide shaft 32 and the rotational guide shaft 33 loosely pierce the lens supporting frames 421 and 431 so that the front movable lens group 42 and the rear movable lens group 43 can be movable along the optical axis direction. On a circumference of the lens supporting frame 421, a projection 422 is formed in a radial direction to engage with the cam groove 13. Similar to the lens supporting frame 421, a projection 432 is formed in a radial direction on the lens supporting frame 431 to engage with the cam groove 14. The arrangement of cam grooves 13, 14, and the projections 422, 432 is the same as that of the prior art photographing device. When the cylindrical cam ring 11 rotates around the optical axis, the lens supporting frames 421 and 431 move along the optical axis direction.

Figure 4:
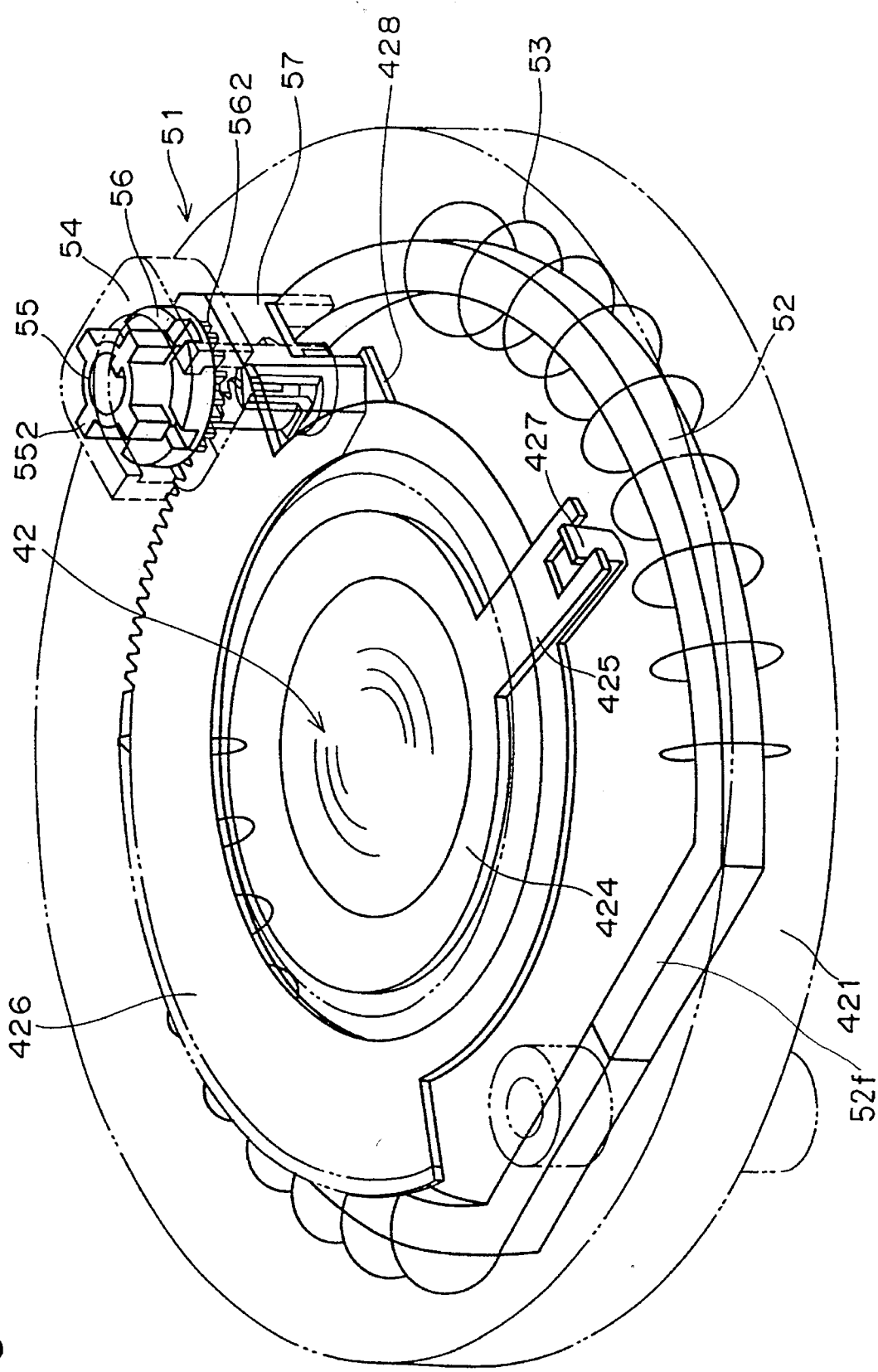
FIG. 4 is an enlarged perspective view of the front movable lens group.

FIG. 4 is an enlarged perspective view of the front movable lens group 42, which moves in the optical axis direction independently from other lens groups 41 and 43 when a focusing operation is performed. In FIG. 4, the lens supporting frame 421 is depicted by imaginary lines. The lens supporting frame 421 includes an inner supporting frame 424 which is coaxially and moveably supported in the lens supporting frame 421, and a gear 426 which is coaxially located with the inner supporting frame 424 at the object side of the front movable lens group 42. The inner supporting frame 424 actually supports the plurality of lenses of the front lens group 42. Specifically, as shown in FIG. 2 and FIG. 4, the lens supporting frame 421 has a circular opening 423 coaxially formed with the front movable lens groups 42, and a circumference of the opening 423 and the outer circumference of the inner supporting frame 424 are provided with helicoids. This helicoid connection between the lens supporting frame 421 and the inner supporting frame 424 enables an axial movement of the front movable lens group 42 when a focusing operation is performed. A fork 425 is projected from the circumference of the inner supporting frame 424. The fork 425 engages with a tab 427 formed on a part of a circumferential portion of the semi-circular plate member on which the gear 426 is formed. When the gear 426 rotates, the torque is transmitted to the inner supporting frame 424 through the tab 427 and the fork 425 to move the inner supporting frame 424 in the optical axis direction. In this embodiment, as FIG. 4 shows, the gear 426 is not formed on an entire circumference of the semi-circular plate member, but formed a part of the plate. The gear 426 engages with a clutch gear 56 of a clutch mechanism 51 that will be explained later.

The lens supporting frame 421 further includes a biasing member 428 which is located at the camera body side of the lens supporting frame 421. A stem portion of the biasing member 428 has a coaxial opening to fit an outer periphery configuration of the rearmost lens of the front movable lens group 42. The biasing member 428 is extended from the stem portion in a radial direction to come into contact with and bias the tube member 55 of the clutch mechanism 51.

The clutch mechanism 51 is located on the lens supporting frame 421. As FIG. 4 shows, a semi-circular yoke 52, having a flat portion 52f, is located in the lens supporting frame 421 in a manner that the yoke 52 surround the front movable lens group 42. A coil 53 is provided around a part of the circular portions of the yoke 52. At a point on the yoke 52 corresponding to the rotational guide shaft 33, a cut-away portion (FIG. 5) is formed. A clutch-operation section 54 of the clutch mechanism 51 is supported on the lens supporting frame 421, and positioned at the cut-away portion. FIG. 5 is a partial perspective view of the clutch mechanism 51. The clutch-operation section 54 comprises the tube 55 into which the rotational guide shaft 33 is inserted, a clutch gear 56 into which the tube member 55 is inserted, and a slide piece 57 into which the tube member 55 is inserted and arranged to move together with the tube member 55. The slide block 57, which is made of a material such as cast iron, is positioned side by side in the optical axis direction with the clutch gear 56.

On an inner surface of the tube 55, a key 551 is integrally formed toward the center of the tube 55, and the key 551 engages with the key groove 33a. Accordingly, the tube member 55 can move independently from the rotational guide shaft 33 in the optical axis direction, but rotates together with the rotational guide shaft 33. In addition, on the outer surface of the tube 55, four tabs 552 are radially formed. At the end of the tube member 55, elastic deformable members 553 are formed on the cylindrical surface of the tube 55 by cutting a part of the cylindrical surface of the tube member 55. Moreover, hooks 554 are integrally formed at the free end of the deformable member 553. More precisely, the end of the slide piece 57 (the right hand side in FIG. 2, for example) comes into contact with the biasing member 428, so that the slide block 57 is constantly biased in the optical axis direction. In this embodiment, the slide block 57 is constantly biased to the left hand side in FIG. 2.

The clutch gear 56, which is formed in a thick circular plate, is arranged to rotate freely in either direction around the rotational guide shaft 33, and to allow the tube member 55 move in the optical axis direction. As FIG. 5 shows, at one side of the clutch gear 56, four grooves 561 are formed in a radial direction to engage with the tabs 552 formed on the tube member 55. When the grooves 561 engage with the tabs 552, the tube member 55 and the clutch gear 56 rotate together in the same direction. In this embodiment, the four grooves 561 are formed in a manner that they are radially located at 90 degrees increments about the circumference. The four tabs 552 are also formed in a manner that they are radially located at 90 degree increments. In other words, they are formed like a Cross. According to this structure of the grooves 561 and the tabs 552, the rotational guide shaft 33 is arranged to rotate by a ¼ rotation as a minimum rotational amount so that the tabs 552 can engage the grooves 561 with ease when the tube member 55 moves in the optical axis direction. At the other side of the clutch gear 56, a spur gear 562 is integrally formed to engage constantly with the gear 426 which is coaxially located with the inner supporting frame 424 at an object side of the front movable lens group 42.

At a cross section of the slide block 57, normal to the optical axis, a through hole 571 is formed. The tube member 55 is inserted into the through hole 57, and the hooks 554 formed on the tube member 55 engage an edge of the through hole 571. The tube member 55 and the slide block 57 can relatively rotate, and move together in the optical axis direction. The slide piece 57 is located at the cut-away portion of the yoke 52. Specifically, at the cut-away portion, the cross sections of the yoke 52 face grooves 572 formed on the slide block 57 as shown in FIG. 4. The slide piece 57 includes contacting surfaces 572a which are formed on the surface of slide piece 57, and a tip of the yoke 52 at the cut-away portion, contacting surfaces 52a, which correspond to the contacting surfaces 572a, are formed. When the coil 53 around the yoke 52 is energized, the slide piece 57 is attracted, against the biasing member 428, to the yoke 52 along the contacting surfaces 572a and 52a.

As explained, in the clutch mechanism 51, when the coil 53 is not energized, as shown in FIG. 6(a), the tube member 55 is biased by the biasing member 428 toward the left side of the drawing. The tube 55 and the slide piece 57 which are arranged to move together in the optical axis direction stay apart from the clutch gear 56. In other words, the tabs 552 formed on the tube 55 and the grooves 561 formed on the clutch gear 56 do not engage each other. Consequently, if the tube 55 rotates, the clutch gear 56 does not rotate. On the other hand, when the coil 53 is energized, as shown in FIG. 6(b), a magnetic force generated by a magnetic field of the coil 53 attracts the slide block 57, against the biasing member 428, toward the yoke 52 (the right side of the drawing) along the contacting surfaces 572a and 52a each of which is formed on the slide block 57 and the yoke 52. The tabs 552 formed on the tube member 55 and the grooves 561 formed on the clutch gear 56 then engage each other. Consequently, when the tube member 55 rotates, the clutch gear 55 rotates.

According to FIG. 1 and FIG. 2, an outline of the operation is explained. When the zooming switch 2 (FIG. 10) is operated, the driving motor 21 rotates in a forward or reverse rotational direction according to a zooming operation toward a telephoto direction or a wide angle direction. For example, assume a case in which the driving motor 21 forwardly rotates to perform a zooming operation toward a telephoto side. The rotation of the driving motor 21 causes a rotation of the cylindrical cam ring 11 in the first rotational direction through the gear train 24. By the rotation of the cylindrical cam ring 11 in the first rotational direction, the front movable lens group 42 and the rear movable lens group 43, following the cam grooves 13 and 14, move along the optical axis direction. Precisely, the projections 422 and 432 respectively formed on the lens supporting frame 421 (the front movable lens groups 42) and 431 (the rear movable lens groups 43) move along the cam grooves 13 and 14. Consequently, the front movable lens groups 42 and the rear movable lens groups 43 move along the optical axis direction with the guide of the cam grooves 13, 14, and the guide shaft 32 and the rotational guide shaft 33. The relative movement of the front and rear movable lens groups 42 and 43 sets a focal length of the tele photo side that a photographer wishes to obtain. After the zooming operation is completed, a focusing operation is performed by reversely rotating the driving motor 21 in a manner that the front movable lens groups 42 is moved with respect to the lens supporting frame 421.

On the other hand, when the driving motor 21 reversely rotates to perform a zooming operation toward a wide angle direction, the cylindrical cam ring 11 rotates in the second rotational direction through the gear train 24. The relative movement of the front and rear movable lens groups 42 and 43 sets a focal length of the wide angle side that a photographer wishes to obtain. After the zooming operation is completed, a focusing operation is performed by forwardly rotating the driving motor 21 in a manner that the front movable lens groups 42 is moved with respect to the lens supporting frame 421.

Based on FIG. 7(a) to (e), the sequence of the zooming and focusing operations are more explicitly explained. Each diagram (a) to (e) of FIG. 7 is a time chart showing the operation of the driving motor 21, the cylindrical cam ring 11, the rotational guide shaft 33 and the coil 53 and the front movable lens group 42. And, (a) to (e) of FIG. 7 show the sequence of the operations of the above mentioned elements when a zooming operation is performed toward the telephoto side. When the zooming switch 2 performs the zooming toward the telephoto side, the driving motor 21 forwardly rotates. Part of the driving torque generated by the driving motor 21 is transmitted to the gear 12 formed on the cylindrical cam ring 11 through the gear train 24 to cause the rotation of the cylindrical cam ring 11. The rest of the driving torque is transmitted to the gear 34 integrally formed at the tip of the rotational guide shaft 33 through the gear train 25 to rotate the rotational guide shaft 33. As the idling mechanism 26 is provided between the first and second gears 30A and 30B, when a rotational direction is changed from forward to reverse or vice versa, the rotation of the cylindrical cam ring 11 is suspended until the tab 27a of the driving wheel 27 comes into contact with the other side of the pin 28a of the driven wheel 28. On the other hand, the rotational guide shaft 33 is continuously rotated.

Due to the rotation of the cylindrical cam ring 11, the projections 422 and 432 respectively formed on the lens supporting frame 421 and 431 move in the cam groove 13 and 14, so that the projections 422 and 432 move in the optical axis direction. The lens supporting frames 421 and 431 are, guided and supported by the guide shaft 32 and the rotational guide shaft 33 and, follow the cam grooves 13 and 14, and then a zooming operation is performed by the front movable lens group 42 and the rear movable lens group 43, so that a focal length which a photographer wishes is set.

Figure 7:
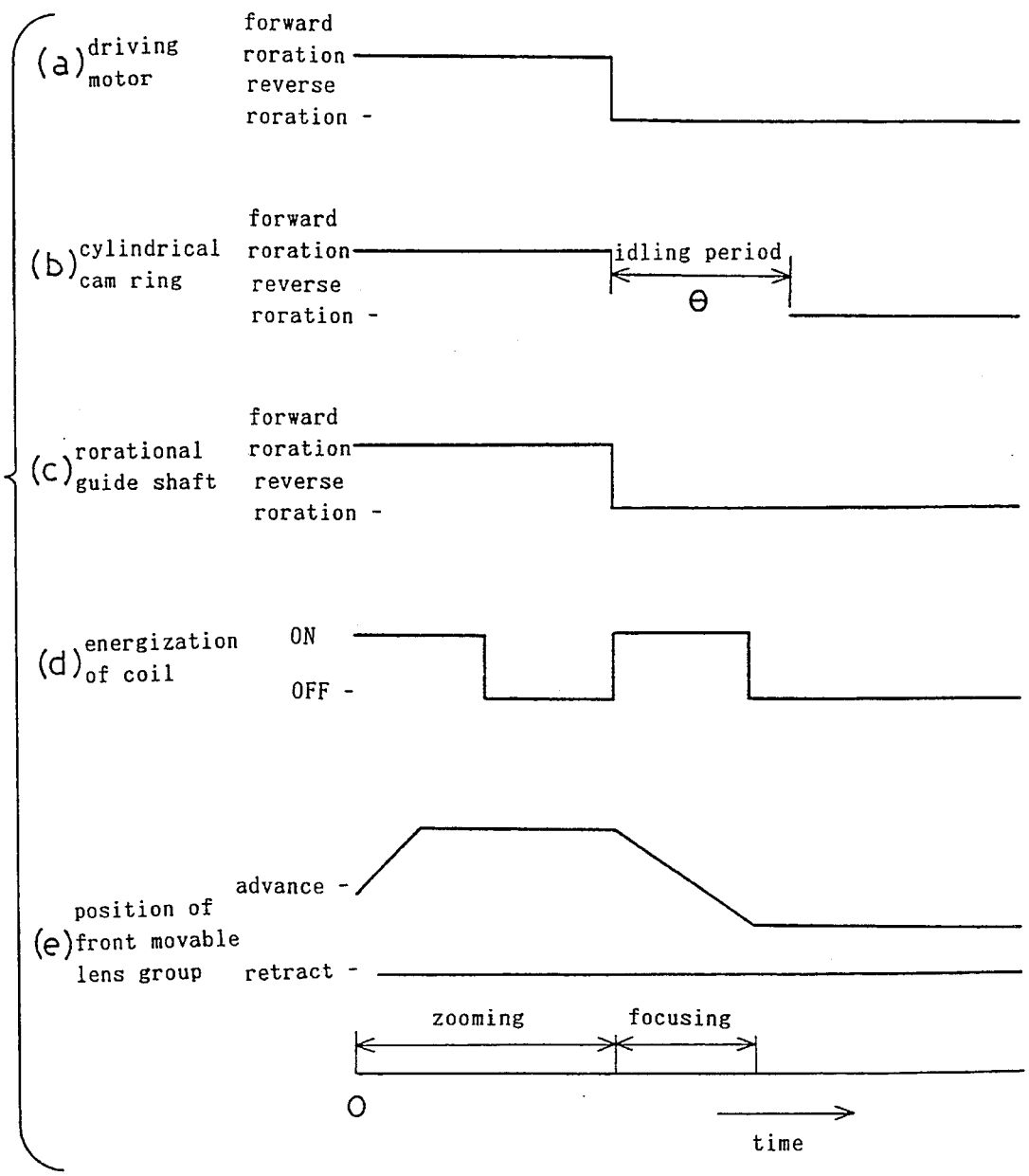
FIG. 7 is a time-chart indicating the sequence of zooming and focusing by the driving motor.

Prior to the zooming, as an initializing operation, the front movable lens groups 42 is moved to the most advanced position with respect to the lens supporting frame 421, as diagram (e) of FIG. 7 shows. For the purpose of the initialization, the coil 53 is energized for quite a short time. As the yoke 52 is magnetized, the slide block 57 moves against the biasing member 428, towards the yoke 52. The tube member 55 which is movable in the optical axis direction together with the slide block 57 is moved along the rotational guide shaft 33, so that the tabs 552 engage with the grooves 561. The rotation of the tube 55, which is connected with the rotational guide shaft 33 through the key 551 and the groove 33a, is transmitted to the clutch gear 56. When the clutch gear 56 rotates, the spur gear 562 also rotates, so that the rotation of the clutch gear 56 is transmitted to the gear 426. At this time, as the tab 427 formed on the plate on which the gear 426 is formed engages with the fork 425 projected from the inner supporting frame 424, the inner supporting frame 424 rotates. The lens supporting frame 421, i.e., the front movable lens group 42, is moved to the advanced position in the optical axis direction with respect to the lens supporting frame 421. In this embodiment, the front movable lens group 42 is moved to the advanced position, not the retracted position, to initialize the position of the front movable lens group 42.

When the time enough for advancing the front movable lens group 42 to the advanced position lapses, the coil 53 is deenergized. The slide block 57 is not attracted by the magnetic force. The slide piece 57 is returned to the original position by the biasing member 428, so that the tabs 552 and grooves 561 are disconnected. After this disconnection, if the tube member 55 rotate together with the rotational guide shaft 33, the rotation is not transmitted to the clutch gear 56 and the gear 426. Consequently, the front movable lens group 42 is not moved with respect to the lens supporting frame 421.

When the cylindrical cam ring 11 stops rotating at a predetermined rotational position to set a predetermined focal length, the control circuit 10 is informed by a detector (not shown) to detect a rotational position of the cylindrical cam ring 11 that the photographing optical system is set at the predetermined focal length, and the driving motor 21 is soon stopped by a command from the control circuit 10. After that, the coil 53 of the clutch mechanism 51 is energized, and the driving motor 21 starts rotating reversely for performing a focusing operation. According to the reverse rotation of the driving motor 21, the rotational guide shaft 33 is reversely rotated through the gear train 25. In the clutch mechanism 51, by the energization of the coil 53, the slide piece 57 is attracted to the yoke 52. The tabs 552 formed on the tube 55 consequently engage with the grooves 561 formed on the clutch gear 56, so that the rotation of the rotational guide shaft 33 is transmitted to the clutch gear 56, and then to the gear 426.

At this moment, as the driving motor 21 reversely rotates, the gear 426 also reversely rotates, so that the front movable lens group 42 is moved toward the normal position. The rotation amount of the driving motor 21 is determined by a focus detecting device (not shown). When the focusing operation finishes, electric supply to the coil 53 is suspended, and the coil 53 is deenergized. The clutch mechanism 51 is in the disconnected state, and the movement of the front movable lens group 42 toward the normal position is stopped.

During the movement of the front movable lens group 42 toward the normal position, the driving torque generated by the driving motor 21 is also transmitted to the cylindrical cam ring through the gear train 24. However, the torque is not transmitted due to the idling mechanism 26. More specifically, the cylindrical cam ring 11 does not rotate until the tab 27a on the driving wheel 27 comes into contact with the other side of the pin 28a on the driven wheel 28. The operation of the idling mechanism 26 is mainly shown in diagrams (a) to (e) of FIG. 7. According FIG. 7 diagrams (a) and (b) of FIG. 7, after the driving motor 21 is changed from the forward rotation to the reverse rotation, it is not until the idling time corresponding to the angle Θ lapses that the cylindrical cam ring 11 starts to rotate. On the other hand, as the driving torque is constantly supplied to the rotational guide shaft 33 through the gear train 25, according to diagrams (c) and (e) of FIG. 7, even during the idling time, the front movable lens group 42 is moved from the most advanced position to the normal position. The focusing operation of the front movable lens group 42 does not cause the rotation of the cylindrical cam ring 11, so that no adverse effects result in the zooming operation. On the operations shown in FIG. 7, to secure the maximum moving range of the front movable lens group 42, the angle Θ is determined. And, it should be noted that the angle of focusing is variable (less than Θ) based on an object distance.

The above explanation is based on initialization of the front movable lens group 42 prior to the zooming operation toward telephoto side with setting the front movable lens group 42 at the advanced position with respect to the lens supporting frame 421. It can also be arranged to set the front movable lens group 42 at the retracted position for the purpose of the initialization.

On the other hand, when zooming toward the wide angle direction, the sequence of operations is quite the same as zooming toward the telephoto direction though the driving motor 21 is reversely rotated as already explained. Actually, when the driving motor 21 reversely rotates, the cylindrical cam ring 11 also rotates reversely through the gear train 24. According to the cam grooves 13, 14, and the projections 422, 432 of the lens supporting frames 421, 431, the front movable lens group 42 and the rear movable lens group 43 are relatively moved to set a focal length in the wide angle direction. At this time, the clutch mechanism 51 is temporarily connected to perform the initialization of the front movable lens group 42. The front movable lens group 42 is then set at the normal position with respect to the lens supporting frame 421.

After a focal length that a photographer wants is set, by moving the front movable lens group 42, according to the rotation of the rotational guide shaft 33, in an advancing direction with respect to the lens supporting frame 421, a focusing operation is performed. While the focusing operation is being performed, the cylindrical cam ring 11 does not rotate due to the idling mechanism 26, so that nothing related to the rotation of the cylindrical cam ring 11 adversely influences the focusing operation.

According to the embodiment of the present invention, the driving motor 21 (one motor housed in the camera body) can perform both zooming and focusing. Consequently, unlike the prior art, the auxiliary motor exclusively used for independently moving the front movable lens group 42 is unnecessary. In other words, a source of vibration is eliminated from the photographing optical system, so that the previously recognized adverse effects due to the vibration is consequently eliminated. As already explained, in place of the auxiliary motor, the clutch mechanism 51 is provided. In the clutch mechanism 51, the yoke 52 shoulders most of the weight of the clutch mechanism 51, but the yoke 52 is formed in a ring-like shape and located around the front movable lens group 42. On the other hand, the tube member 55 and the slide block 57 are light enough not to cause an eccentricity of weight balance. Occurrence of eccentric force to the helicoid of the front movable lens group 42 is successfully avoided, and focusing and zooming by the operation switch and smooth movement of the front movable lens group 42, with an enhanced reliability of the entire device, is materialized.

Figure 8:
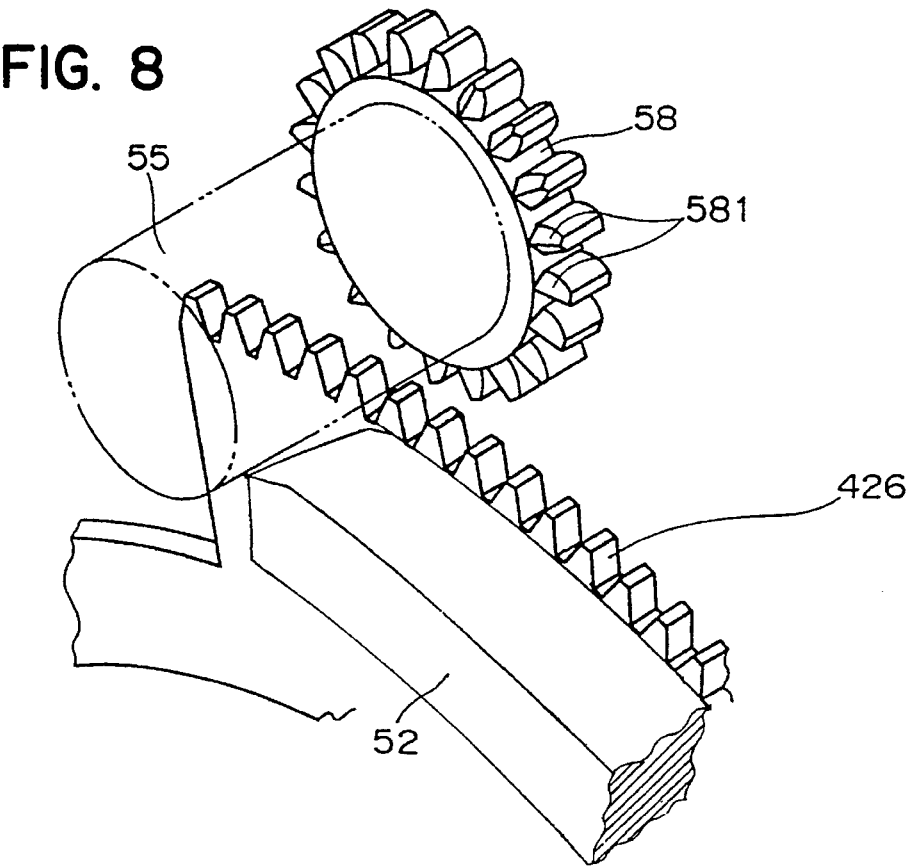
FIG. 8 is a perspective view of the clutch mechanism of the second embodiment.
Figure 9B:
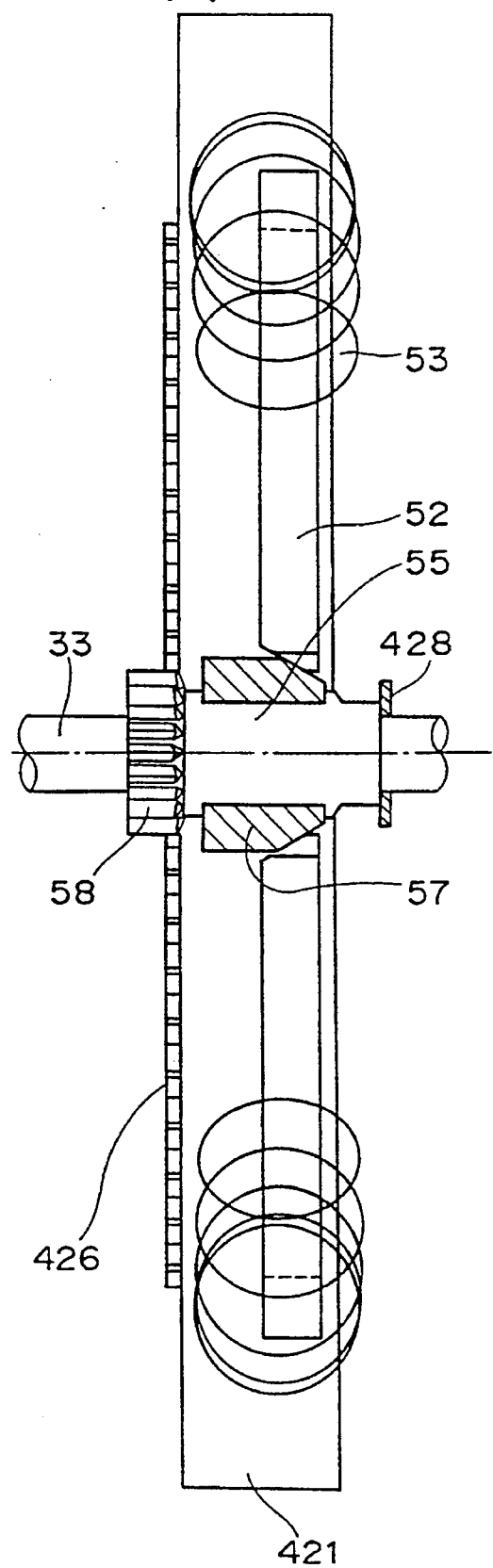
FIG. 9(b) is a view indicating an operation of the clutch mechanism.
Figure 9A:
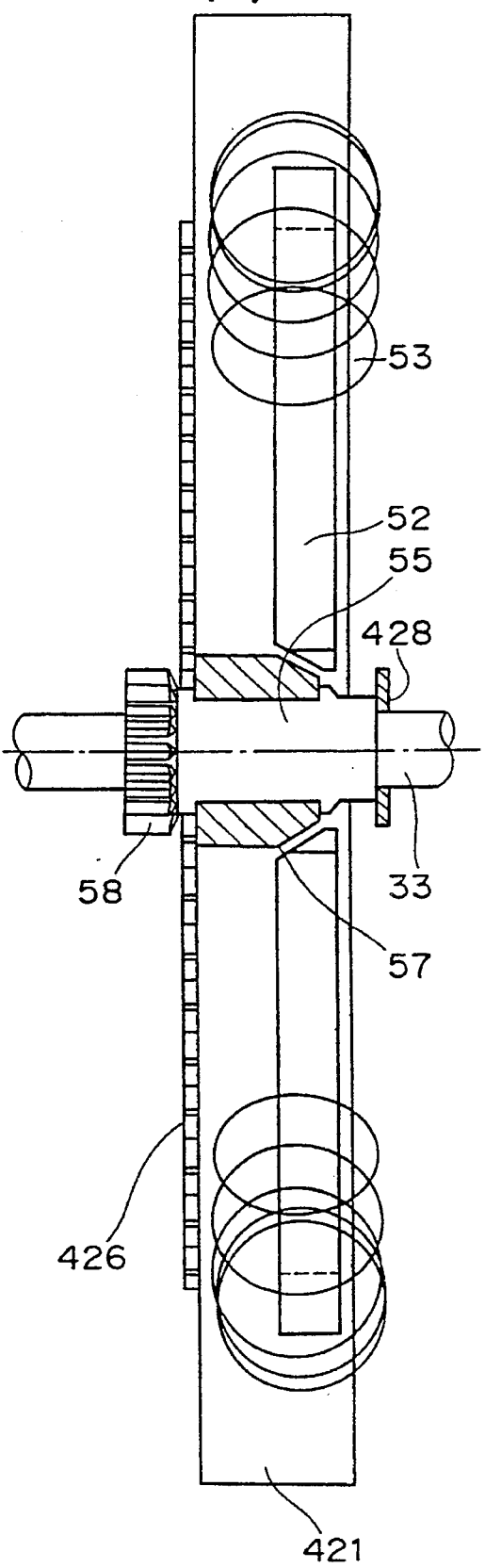
FIG. 9(a) is a view indicating an operation of the clutch mechanism.

The second embodiment of the present invention is shown in FIG. 8. Actually, FIG. 8 indicates a clutch mechanism different from that of the first embodiment. In the second embodiment, instead of the clutch gear 56, a small gear 58 is integrally formed in the tube 55. The small gear 58 is arranged to mesh with gear 426 selectively. The state of operations of the gear 58 are shown in FIG. 9(a) and FIG. 9(b). Like the first embodiment, the tube 55 is arranged to rotate together with the rotational guide shaft 33, and the slide block 57 is provided around the tube member 55 so that the slide block 57 and the tube 55 can move together in the optical axis direction. And, at the end of the tube member 55, the small gear 58 is coaxially provided.

As shown in FIG. 9(a), when the focusing operation is not performed (i.e., when the coil 53 is not energized), due to the biasing member 428, the tube 55 is positioned so that the slide piece 57 comes into contact with the gear 426. The small gear 58 does not mesh the gear 426. On the other hand, when the coil 53 is energized, as shown in FIG. 9(b), the slide block 57 is attracted to the yoke 52, so that the tube member 55 together with the slide block 57 moves toward the yoke 52. Consequently, the small gear 58 meshes with the gear 426. To ease the meshing of the gear 426 and the small gear 58, each cog of the small gear 58 is provided with an wedge-shaped side 581. Specifically, the wedge-shaped side 581 is formed on the side of cog, which faces the gear 426. The wedge is oriented to the optical axis direction.

According to the above structure, when the small gear 58 meshes with the gear 426, the driving torque transmitted by the rotational guide shaft 33 is transmitted to the tube member 55 to the small gear 58, and finally to the gear 426. In the second embodiment, other than the clutch mechanism, the rest is substantially the same as that of the first embodiment. In the clutch mechanism of the second embodiment, the number of parts can be reduced because the small gear 58 (in place of the clutch gear 56) is integrally formed with the tube member 55.

As a modification of the second embodiment, the circular gear 426 and the helicoid of the inner supporting frame 424 can be arranged to mesh with each other by an electro-magnetic clutch device formed in a circular shape. According to this electro-magnetic clutch, the gear 426 is arranged to rotate constantly with the rotational guide shaft 33. Due to the selective engagement of the gear 426 and the helicoid of the inner supporting frame 424 by the electro-magnetic clutch, the driving torque from the rotational guide shaft is transmitted to the helicoid so that the front movable lens group 42 can move in the optical axis direction. In this modification, as the electro-magnetic clutch is formed in a circular shape, the clutch can be provided around the front movable lens group 42. This arrangement of the electro-magnetic clutch can eliminate the occurrence of vibration and eccentricity of the weight balance.

In the first and second embodiments, it is apparent that the present invention is applied to the photographing optical system having a plurality of lens groups. More specifically, at least one lens group out of plural lens groups in the photographing optical system is independently moved for the purpose of focusing. Not limited to the first and second embodiments, the present invention is also applicable to a case in which plural lens groups are driven by rotation of the cam ring and an aperture mechanism is driven by rotation of the rotational guide shaft. In either case, it is essential to locate the clutch mechanism around the driven member, i.e., the clutch mechanism should be coaxially located around the optical axis of the photographing system.

Also in the explained two embodiments, one motor (the driving motor 21) is provided to perform both zooming and focusing. The present invention is applicable to a device in which a motor is exclusively provided for focusing. In addition, the present invention is also applicable to a driving device used for other than focusing is operated by a motor exclusive for that purpose.

As can be understood from the above discussion, according to the present invention, the photographing device is constituted in a manner that a driving mechanism is provided in a photographing optical system, a driving source is located outside the photographing optical system, a rotational shaft is located parallel with an optical axis of the photographing optical system. The rotational shaft, located in said photographing optical system, connects the driving source and the driving mechanism, an electro-magnetic clutch mechanism is located around the optical axis of the photographing optical system, the electro-magnetic clutch mechanism is arranged to connect/disconnect the driving mechanism and the driving source; therefore an auxiliary driving means in the photographing optical system is unnecessary, so that adverse effects by vibration caused by the auxiliary driving means is prevented, and an uneven weight balance due to the weight of the auxiliary driving means is also prevented. The reliability of the photographing device is accordingly enhanced.

The electro-magnetic clutch mechanism is constituted to generate a closed magnetic circuit around said optical axis when said electro-magnetic clutch is energized. For example, assuming that the electro-magnetic clutch mechanism comprises a substantially circular yoke, having a cut-away portion therein, located around the optical axis of the photographing optical system, a slide piece movable between, along the optical axis, between a first position and a second position, and, a clutch member for transmitting a torque from the rotational shaft to a clutch gear meshing with the driving mechanism when the slide block is at the first position, the electro-magnetic clutch mechanism is located around the optical axis of the photographing optical system, so that the weight balance of the photographing optical system in a lens barrel can be in equilibrium.

Furthermore, a tube into which said rotational shaft is inserted is provided so that the tube member rotates together with the rotational shaft, and the slide piece is coaxially located around the tube member as to move together with the tube member in said optical axis direction against a biasing force of a spring member. Accordingly, the slide piece can be smoothly moved along the rotational shaft, which enables preferable clutch operations.

In addition to the above, as the electro-magnetic clutch mechanism of the present invention comprises a substantially circular yoke, having a cut-away portion therein, located around the optical axis of the photographing optical system, a slide block movable between, along the optical axis, between a first position and a second position, and, a clutch gear that rotates together with the rotational shaft and moves together with the slide piece, and that meshes with a gear provided on the driving mechanism when the slide piece is at the first position, the clutch gear itself works as a clutch member, so that simplification of the photographing device can be attained because without the clutch member, a driving torque of the rotational shaft can be transmitted to the driving mechanism. In this case, as the cog of the clutch gear is provided with a tapered side facing the meshing counterpart, a meshing to the driving mechanism can be smoothly and surely conducted.

As another aspect of the present invention, there is provided a photographing optical system containing a plurality of lens groups, a first means for moving said lens groups for a first operation of the photographing optical system, and being driven by a first driving source located outside the photographing optical system, a second means for moving the lens groups for a second operation of the photographing optical system, and being located outside the photographing optical system, and means for coordinating the first and the second moving means so that while the second operation is performed, the first operation is suspended.

According to this structure, the entire operation of the photographing optical system can be smoothly performed because no source of vibration is located in the photographing optical system. Moreover, due to the coordinating means, a transition from zooming operation to focusing operation can be performed with simple and vibration-free mechanisms.

I claim:

1. A photographing device, comprising:
   a driving mechanism provided in a photographing optical system;
   a driving source located outside said photographing optical system;
   a rotational shaft located parallel with an optical axis of said photographing optical system, said rotational shaft being located in said photographing optical system, and connecting said driving source and said driving mechanism; and
   an electro-magnetic clutch mechanism located around said optical axis of said photographing optical system, said electro-magnetic clutch mechanism arranged to connect/disconnect said driving mechanism and said driving source.

2. The photographing device according to claim 1, wherein said driving mechanism is provided for a focusing operation of said photographing device.

3. The photographing device according to claim 2, wherein said electro-magnetic clutch is arranged to generate a closed magnetic circuit around said optical axis when said electro-magnetic clutch is energized.

4. The photographing device according to claim 3, wherein said electro-magnetic clutch mechanism comprises:
   a circular yoke, having a cut-away portion therein, said circular yoke being located around said optical axis of said photographing optical system;
   a slide block movable along said optical axis, between a first position and a second position; and
   a clutch member for transmitting a torque from said rotational shaft to a clutch gear when said slide block is at said first position, said clutch gear being arranged to mesh constantly with a gear provided on said driving mechanism.

5. The photographing device according to claim 4, wherein said electro-magnetic clutch mechanism further comprises a tube member into which said rotational shaft is inserted so that said tube member rotates together with said rotational shaft, and said slide block is coaxially located around said tube member as to move together with said tube member in said optical axis direction against a biasing force of a spring member when said yoke is energized, and wherein said clutch gear is located around said tube member as to rotate together with said tube member when said slide block moves in said optical axis direction in response to an electro-magnetic force.

6. The photographing device according to claim 1, wherein said electro-magnetic clutch mechanism comprises:
   a circular yoke, having a cut-away portion therein, said circular yoke being located around said optical axis of said photographing optical system,
   a slide block movable along said optical axis, between a first position and a second position, and
   a clutch gear that rotates together with said rotational shaft and moves together with said slide block, said clutch gear meshing with a gear provided on said driving mechanism when said slide block is at said first position.

7. The photographing device according to claim 6, wherein said clutch gear includes a predetermined number of cogs, wherein a side of each cog, facing said slide piece, is tapered in said optical axis direction.

8. The photographing device according to claim 7, wherein said clutch Gear is integrally formed on said tube member.

9. A photographing device, comprising:
   a photographing optical system containing a plurality of lens groups;
   a first means for moving said lens groups for a first operation of said photographing optical system, said first moving means being driven by a first driving source located outside said photographing optical system;
   a second means for moving said lens groups for a second operation of said photographing optical system, said second moving means being driven by a second driving source located outside said photographing optical system; and
   means for coordinating said first moving means and said second moving means so that while one of the said first and second operation is performed, the other of said second and first operation is suspended, said coordinating means including a clutch means for connecting/disconnecting said second moving means and said second driving source, and an idling means for connecting/disconnecting said first moving means and said first driving source.

10. The photographing device according to claim 9, wherein second moving means comprises a rotational shaft located along an optical axis of said photographing optical system, and said rotational shaft is driven by said second driving source.

11. The photographing device according to claim 10, said clutch means being located in said photographing optical system for transmitting a rotation of said rotational shaft to said at least one lens group to be moved in said second operation when said clutch means is in an operative state.

12. The photographing device according to claim 11, wherein said clutch means is an electro-magnetic clutch located coaxially around the optical axis of said photographing optical system.

13. The photographing device according to claim 12, wherein said electro-magnetic clutch is arranged to generate a closed magnetic circuit around said optical axis when said electro-magnetic clutch is energized.

14. The photographing device according to claim 13, wherein said electro-magnetic clutch comprises:

a yoke formed in a circular shape with a cut-away portion, and said yoke being located around said optical axis of said photographing optical system;

a slide block into which said rotational shaft is inserted, said slide block movably located in said cut-away portion so that said slide block moves along said optical axis direction in response to a magnetic force generated in said yoke, between a first position in which said electro-magnetic clutch is operable and a second position where said electro-magnetic clutch is not operable;

a tube member coaxially located between said rotational shaft and said slide block, said tube member arranged to rotate together with said rotational shaft and to be movable in said optical axis direction together with said slide block;

a clutch gear, into which said tube is inserted, being located in the vicinity of said slide block along said optical axis direction, said clutch gear arranged to move freely in a rotational direction and an axial direction along said optical axis direction in a free state; and a biasing member for biasing said slide block in said optical axis direction so that said slide block and said yoke are spaced apart, wherein when said yoke is energized, said slide block together with said tube member moves, against said biasing member, to said first position, so that said clutch gear is in an engaged condition to transmit said rotation of said rotational shaft to said at least one lens group to be moved in said second operation.

15. The photographing device according to claim 14, wherein said tube member is provided with a key on an inner surface of said tube member to engage a key groove formed on said rotational shaft, and said tube member is provided with a plurality of tabs on an outer surface of said tube member for engaging a corresponding number of grooves formed on said clutch gear so that said tabs on said tube member engage said grooves on said clutch gear when said slide block is at said first position.

16. The photographing device according to claim 15, wherein said clutch gear is formed on a circular plate having a predetermined thickness in said optical axis direction, wherein said grooves are formed on one circular side, and a spur gear is formed on the other circular side of said plate, and wherein said spur gear constantly engages a gear connecting said at least one lens group to be moved in said second operation.

17. The photographing device according to claim 16, wherein said second moving means further comprises a second gear train connecting said rotational shaft and said second driving source.

18. The photographing device according to claim 17, wherein said photographing optical system includes a cylindrical cam ring containing said plurality of lens groups, and said first moving means includes a gear formed around an outer circumference of said cylindrical cam ring and a plurality of cam grooves to which a plurality of movable lens groups out of said plurality of lens groups engage, a first gear train connecting said gear formed around said cylindrical cam ring and said first driving source, said first gear train including at least a first gear constantly connecting said first driving source, and a second gear constantly meshing with said gear formed on said cylindrical cam ring.

19. The photographing device according to claim 18, wherein said idling means is located in said first gear train so that a movement of said cylindrical cam ring, for the purpose of said first operation, is temporarily suspended while said second operation is performed by said second moving means when said electro-magnetic clutch is in said operative state.

20. The photographing device according to claim 19, wherein said idling means comprises a driving wheel having a tab located next to said first gear, and a driven wheel having a pin located next to said second gear.

21. The photographing device according to claim 20, wherein said first gear, said driving wheel, said driven wheel, and said second gear are aligned in this order from the first driving source, said first gear and said driving wheel are connected by a rod, and said driven wheel and said second gear are connected by a rod.

22. The photographing device according to claim 21, wherein said tab and said pin keep contacting at one side while said first operation is performed, and wherein an idling period corresponding to said second operation is generated by a rotation of said driving wheel with respect to said driven wheel until said tab comes into contact with the other side of said pin on said driven wheel.

23. The photographing device according to claim 22, wherein said plurality of lens groups comprises a fixed lens group, a first movable lens group, and a second movable lens group, which are located in this order from an object side, and wherein said electro-magnetic clutch is provided on said first movable lens group.

24. The photographing device according to claim 23, wherein said fixed lens group, said first movable lens group and said second movable lens group are supported in a frame located in said cylindrical cam ring, and said rotational shaft is rotationally supported by said frame.

25. The photographing device according to claim 24, wherein each of said lens groups is supported in a lens supporting frame, and said rotational shaft loosely pierces said lens supporting frame.

26. The photographing device according to claim 25, wherein said first driving source and said second driving source are a single motor located outside said photographing optical system.

27. The photographing device according to claim 26, wherein said first operation is a zooming operation, and said second operation is a focusing operation.

28. The photographing device according to claim 10, wherein said electro-magnetic clutch comprises:

a yoke formed in a circular shape with a cut-away portion, and said yoke being located around said optical axis of said photographing optical system;

a slide block into which said rotational shaft is inserted, said slide block movably located in said cut-away portion so that said slide block moves along said optical axis direction in response to a magnetic force generated in said yoke, between a first position in which said electro-magnetic clutch is operable and a second position where said electro-magnetic clutch is not operable;

a tube member coaxially located between said rotational shaft and said slide block, said tube member arranged to rotate together with said rotational shaft and to be movable in said optical axis direction together with said slide block;

a clutch gear being integrally formed with said tube member;

a biasing member for biasing said slide block in said optical axis direction so that said slide block and said yoke are spaced apart, wherein when said yoke is energized, said slide block together with said tube member moves, against said biasing member, to said first position, so that said clutch gear and said tube member are in an engaged condition to transmit said rotation of said rotational shaft to said at least one lens group to be moved in said second operation.

29. The photographing device according to claim 28, wherein said first driving source and said second driving source are a single motor located outside said photographing optical system.

30. The photographing device according to claim 29, wherein said first operation is a zooming operation, and said second operation is a focusing operation.

31. A photographing device, comprising:

a lens barrel having a photographing optical system;

a driving mechanism for driving the optical system, said driving mechanism being provided in the lens barrel;

a power source for driving the driving mechanism, said power source being out of the lens barrel;

a rotational shaft which is parallel with an optical axis of said photographing optical system and is arranged in the lens barrel, said rotational shaft comprising a part of a connecting mechanism which connects the driving source and the driving mechanism; and, an electro-magnetic clutch mechanism located around said optical axis of said photographing optical system, said electro-magnetic clutch mechanism arranged to connect/disconnect said driving mechanism and said rotational shaft.

\* \* \* \* \*

UNITED STATES PATENT AND TRADEMARK OFFICE
CERTIFICATE OF CORRECTION

PATENT NO. : 5,592,250
DATED : January 7, 1997
INVENTOR(S) : H. SHIMIZU

It is certified that error appears in the above-indentified patent and that said Letters Patent is hereby corrected as shown below:

On the title page, Item [54] and col. 1 line 2, change "PHOTOGRAHING" to ---PHOTOGRAPHING---.

At column 14, line 28 (claim 8, line 2), change "Gear" to ---gear---.

Signed and Sealed this

Twenty-second Day of April, 1997

Attest:

BRUCE LEHMAN

*Commissioner of Patents and Trademarks*

*Attesting Officer*